Jan. 14, 1969     R. B. STANISH     3,422,311
ELECTROMECHANICAL TRANSDUCER
Filed Dec. 9, 1964     Sheet _1_ of 2
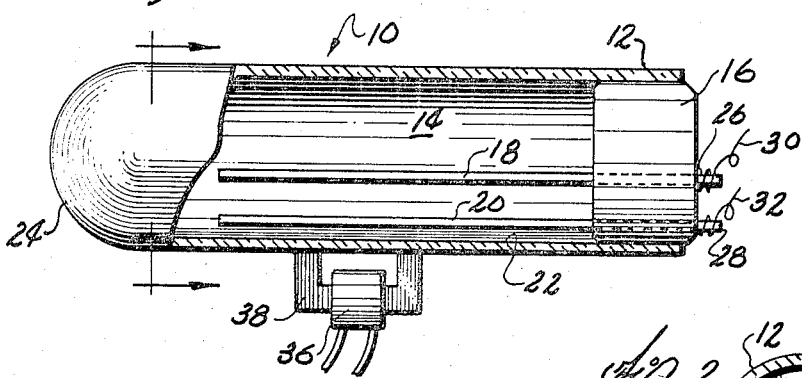
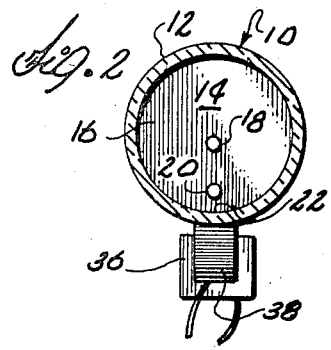
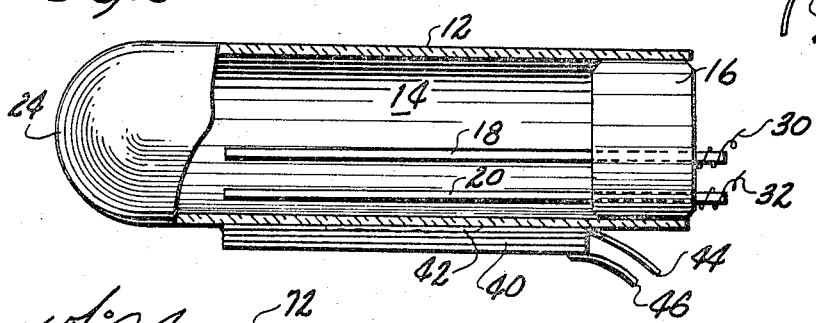
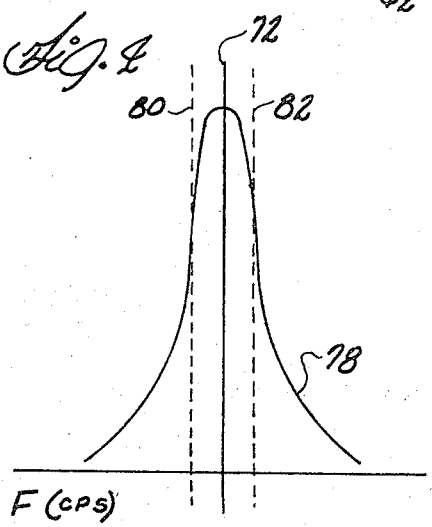
Inventor
Robert B. Stanish
By
Pendleton, Neuman,
Seibold & Williams
Attorneys Inventor
Robert B. Stanish
By Pendleton, Neuman, Seibold & Williams
Attorneys United States Patent Office 3,422,311
Patented Jan. 14, 1969

3,422,311
ELECTROMECHANICAL TRANSDUCER
Robert B. Stanish, Chicago, Ill., assignor to Vibrionics Research Co., Lombard, Ill., a corporation of Illinois
Continuation-in-part of application Ser. No. 193,520, May 9, 1962. This application Dec. 9, 1964, Ser. No. 417,108
U.S. Cl. 315—357          14 Claims
Int. Cl. H01j 15/04; H01j 1/02; H01j 1/88

ABSTRACT OF THE DISCLOSURE

A novel electromechanical transducer which utilizes two conductive elements, one of which is a cantilever mounted electrode within an envelope and the movement of the envelope relative to the electrode causes a variation in the electric current between the two conductive elements. Embodiments of the disclosure include an ionized gas within the envelope to provide the conductive path between the two conductive elements and the movement of the electrode is produced by movement of the envelope and resultant relative movement between the envelope and electrode due to inertia. A method for adjusting the frequency of the electrode is also disclosed in which material is removed from the electrode by passing a substantial and appropriate electric current therethrough.

---

This invention relates to an improved electromechanical transducer and circuits and apparatus associated therewith. More particularly this invention relates to a transducer including a mechanically displaceable element capable of generating a variable electrical phenomenon directly related to the displacement thereof whereby the transducer may be employed in unique systems relying upon such phenomenon. This application is a continuation-in-part of the copending application, Ser. No. 193,-520 which was filed May 9, 1962 now Patent No. 3,246,-259 in the the name of Robert Stanish and is entitled, An Electromechanical Transducer and Systems Relating Thereto.

There are many circumstances in the electronics field where it is desirable to convert mechanical motion into an electrical signal. Many transducers have heretofore been proposed which accomplish this desideratum in various ways and with varying success. Typical of such devices adapted for static displacements are rotatable elements such as potentiometers and variable transformers, linear devices such as sliding wires, tuned sections of wave guide or parallel lines, and distortion sensitive devices such as strain gauges and the like. For dynamic applications such as vibration analysis and the study of resonant phenomenon vibrating reeds, contacts, and visual indicators are most common. Each of these devices has had impediments preventing universal use, the impediments including high cost, complexity, high power requirements, the necessity of amplifiers and auxiliary equipment, lack of accuracy and the like.

The art of motion and displacement measurement has developed greatly in recent years with the development of computer analysis and the need for accurate measurements which can be adopted readily for computer inputs. It is desirable that devices measuring accelerations, velocities or displacements render an electrical analog for immediate use in other processing equipment.

There has been a particular need in the art for an inexpensive yet accurate oscillatory device which can be tuned to a specific periodic frequency and accurately control related circuits or provide a clear indication of the presence of a signal of the predetermined frequency. Such devices are useful in oscillators, frequency sensitive switches, decoding devices to sense a variable frequency code, frequency standards, narrow band pass filters and frequency or period sensitive devices of all kinds where the variable is converted into a periodic electrical signal.

The instant invention provides an improved system and apparatus to satisfy all of the foregoing needs. It is one important object of this invention to provide an improved transducer in which mechanical displacement of a portion thereof alters an electrical signal which is directly related to the displacement.

It is another object of this invention to provide an improved electromechanical transducer which is simple in construction, requires no elaborate equipment and is capable of producing a variable electrical current directly related to the mechanical displacement of an element thereof.

It is still a further object of this invention to provide an improved resonant device adapted to produce an electrical indication of the existence of a predetermined periodic electrical or mechanical phenomenon.

Another object of this invention is the provision of an improved resonant system capable of accurately selecting a periodic signal having a signal desired frequency and generating a control signal in response thereto while rejecting other signals having only slightly different periodicity.

Another object of this invention is the provision of an improved oscillatory circuit having greatly increased signal capabilities while providing excellent wave form and minimum power inputs.

Still another object of this invention is the provision of a stable oscillator system having no active elements such as vacuum tubes, transistors or the like.

Another object of the invention is the provision of an improved resonant device employing a resonant element which can be tuned over a limited range.

Still another object of this invention is provision for driving a resonant element by utilizing electrostrictive units in mechanical association therewith.

It is still another object of the invention to provide an improved method for adjusting the vibratory characteristics of an electromechanical transducer.

It is still another object of this invention to utilize a heretofore unappreciated characteristic of a device having a gas filled envelope with spaced electrodes therein for producing an output dependent in part upon the location of the electrodes within the envelope.

Another object of this invention is the provision of a method of tuning the electrodes of a gas filled transdcer by passing an excessive current therethrough.

Further objects of this invention will become manifest from a consideration of this specification the accompanying drawings and the appended claims.

In one form of this invention a small nonconductive cylindrical envelope is sealed with two electrodes extending into the cavity defined thereby, the electrodes being suspended as cantilevers from one end of the envelope and the envelope being charged with an ionizable gas such as neon. It is preferred that at least one of the electrodes be spaced from the longitudinal axis of the envelope for optimum output, although the device can be operated with reduced efficiency where the electrodes are disposed substantially on the longitudinal axis. It is also preferred that the electrodes be so designed, so disposed within the envelope, or so restrained that either only one of the electrodes is normally in motion, or the two electrodes are secured together to eliminate motion of the two electrodes with respect to one another. If the two electrodes are both activated and are free for independent movement, then they can be employed at independent frequencies or tuned, in accordance with this invention, to the same frequency.

While in one preferred form of the invention disclosed in detail hereinafter an electromagnetic device is employed to produce mechanical displacement of the electrodes with respect to the envelope, it will be apparent that other techniques could be employed although they may involve additional mechanical linkages, seals and the like. Relative movement between the electrode and envelope may be attained either by moving the electrode or the envelope. There are also provided in the detailed disclosure of this specification two specific systems employing the unique transducer, these systems being characterized by unexpected and unforeseeable advantages of high gain, simplicity, and high frequency selectivity. However many additional uses will immediately occur to one skilled in the art where the characteristics of the instant transducer can be employed to advantage.

In accordance with the method which forms a significant part of the instant invention the mass of the electrode may be altered to alter the vibratory characteristics of the transducer. The alteration contemplated may be an increase or a decrease in total mass or it may merely comprise a redistribution or the like. The principal vibratory characteristics of interest is the resonant frequency, although others, such as harmonic generation may also be affected.

For a more complete understanding of this invention, reference will now be made to the accompanying drawings wherein:

FIG. 1 is a longitudinal sectional top view of one embodiment of the invention;

FIG. 2 is a cross sectional view of the embodiment of FIG. 1;

FIG. 3 is a longitudinal sectional view of an alternate embodiment of the invention similar in many respects to the embodiment of FIG. 1;

FIG. 4 is a typical frequency response curve for the transducers illustrated in FIGS. 1–4;

Figure 5:
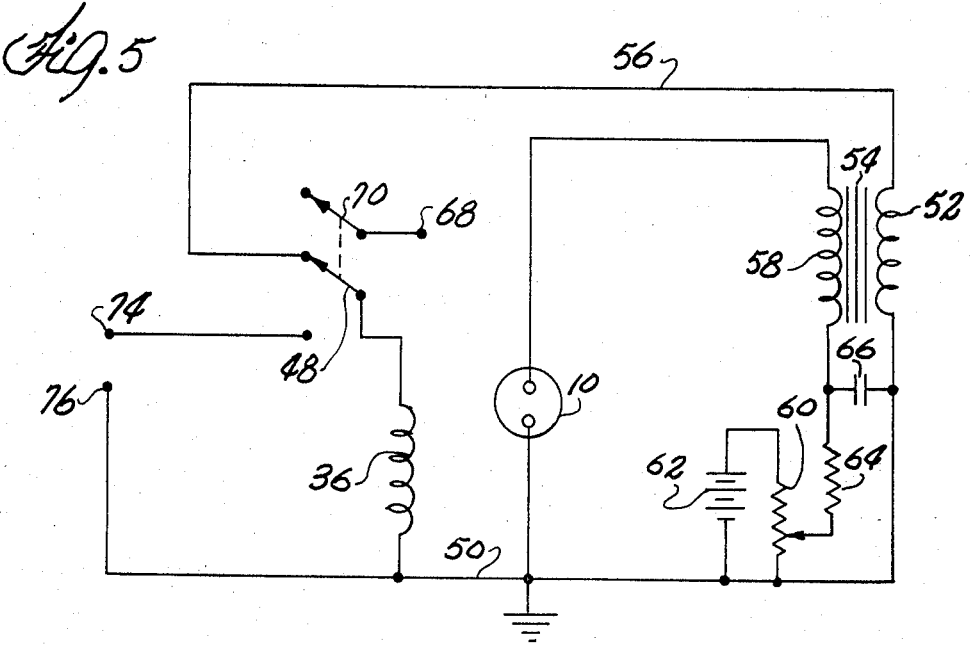
FIG. 5 is a circuit diagram illustrating two systems employing the electromechanical transducers shown in FIGS. 1–4.

Referring now to the drawings, and more particularly to FIGS. 1 and 2, an electromechanical transducer 10 is illustrated including an open ended cylindrical glass envelope 12 filled with an ionizable gaseous medium 14 and sealed at one end with an appropriate plug 16 which may also be glass or any other gas impervious material which will form a seal with the material of which the envelope is made. Two electrodes 18 and 20 are secured in the plug 16 and extend longitudinally into the envelope 12. As shown clearly in FIGS. 1 and 2, at least the electrode 20 is offset substantially from the longitudinal axis of the envelope 12, and is preferably quite close to a wall portion 22 of the envelope. While in the illustrated embodiment the electrodes extend substantially the entire length of the envelope 12 to a point adjacent the sealed end 24, the precise length is not critical, the length of the electrodes 18 and 20 being determined by the desired mechanical and resonant properties thereof, and the length of the envelope being at least sufficient to encase the electrodes.

In the event that both electrodes 18 and 20 are located adjacent the wall portion 22 then the resonant characteristics of each must be taken into account, or they must be constrained for unitary movement as described in U.S. Patent No. 3,246,259.

In the particular embodiment described the electrodes 18 and 20 extend through the end plug 16 to define two terminals 26 and 28. The terminals are relatively short and rigid so that flexible conductors 30 and 32 may be attached thereto by any conventional technique such as soldering, wrapping or the like. The flexible conductors 30 and 32 may be connected into a multiplicity of circuits, several of which will be described hereinafter in substantial detail.

It is possible to obtain many of the advantages of this invention by providing a single movable electrode 20 secured as a cantilever in the end plug 16. While a second conductor, in some form, is essential, it may be secured along the surface of the envelope 12, preferably spaced from the wall portion 22, or it could be an aquadag or similar conductive coating on the nonconductive wall of the envelope 12. In any event it is quite significant that the fixed electrode be spaced away from the movable electrode and also spaced away from the adjacent wall portion 22 of envelope 12 for optimum output characteristics.

If only a single electrode is employed, or if only one electrode is moved significantly then the periodic output will be dependent upon the vibratory characteristics of the principal electrode. A single resonant peak as shown in FIG. 4 is thus produced. Also if two electrodes are driven and are tuned in accordance with this invention, a single peak response curve will result, and in general, the peak will be somewhat steeper than that of a single moving electrode. On the other hand if the two electrodes are driven but are not precisely tuned, then a broadened response curve or two distinct peaks in the response curve may result.

The electrodes 18 and 20 may be moved by various techniques. In the embodiment of FIGS. 1 and 2 an electromagnet including a winding 36 and a fixed core 38 are disposed adjacent the wall portion 22 of the envelope 12 and the core is so oriented that a magnetic flux field is generated which will include within its path at least the electrode 20. Thus by the laws of magnetics, energization of the coil 36 will result in a field which will cause the two electrodes to be attracted toward the poles of core 38. As it is preferred that the electrode 18 disposed outside of the effective field of magnet 36, relative movement of electrode 18 is insignificant, and substantially all of the movement of electrode 20 will be normal to the envelope wall 22.

For the described embodiment to operate it will be apparent that the electrode 20 must be of a magnetically attractable material. In one embodiment of the invention two steel rods are employed which are approximately two inches long and .015 inch in diameter. In a second embodiment two wires, each about one-half inch long and formed from .010 inch Vibralloy stock gave excellent results. Vibralloy is an alloy formed of nickel and iron with about 9% molybdenum which has an extremely stable Young's modulus for changing temperatures. The electrodes may be displaced by other techniques although magnetic deflection is the simplest and preferred. Electrostatic deflection could be employed, or with proper seals, mechanical linkage for external manipulation could be utilized. It is also possible, in the cases of oscillatory phenomenon to use electrodes of substantial mass and physically move the envelope, thus producing relative movement between the envelope and the electrodes as a result of the inertia of the electrodes. This will be described in detail with respect to FIG. 3.

In the preferred embodiment of the invention the envelope 12 was evacuated and then filled with neon gas. It was found that the device operated over a wide range of gas pressures and the optimum gas pressure appears to be dependent upon the other physical characteristics of the design including the spacing of the electrodes, the diameter of the envelope and the position of the electrodes with respect to the adjacent envelope wall 22. Substantial outputs are produced for example when employing neon gas pressures in the range of 1.5 to 10 millimeters of mercury. However, with an envelope having a diameter of 10 millimeters the output appears to be optimum in both amplitude and linearity when employing gas pressures in the range of about 1.5 to 5 mm. (Hg) and even greater efficiency and linearity is attained with pressures in the range of 2 to 3.5 mm. (Hg). Smaller diameter envelopes with somewhat higher pressures have also proven highly satisfactory. For example, devices having envelope diameters of only a few millimeters, such as the NE 2 type neon bulb have proven very satisfactory with gas pressures over a range including 15 mm. and 30 mm. (Hg). However, the tuning techniques to be described are generally better applied to the devices employing lower gas pressures. While neon appears to be the most desirable gaseous medium because of its availability and low cost, any ionizable medium including krypton, argon, xenon and the like, or mixtures of various gases may be employed. It is obvious that the artisan must relate the physical dimensions of the various components to the gas characteristics to optimize output and linearity of the device.

An alternate embodiment of the invention is illustrated in FIG. 3. The operation and construction are substantially the same as already described with respect to FIGS. 1 and 2. The envelope 12 has one closed end 24, the other end being closed by an appropriate sealing plug 16. The cavity is charged with an appropriate ionizable gas such as neon. In the embodiment of FIG. 3, however, the electromagnet 36 is replaced with an electrostrictive device 40 secured to the glass envelope 12 with an appropriate cement 42. An epoxy or similar cement is well suited to this use. The electrostrictive device 40 may be of any well-known type, or can be replaced with any other device capable of vibrating the envelope 12. The preferred device is a multiple layer barium titanate transducer. One such device known as Multimorph is well suited to this use. Devices of this general type are described in U.S. Letters Patent No. 2,478,223 entitled Electrostrictive Translator. The electrostrictive device vibrates the envelope transverse to the electrode axis and thus relies upon inertia of the electrode to produce relative motion. The device 40 may be energized through a pair of leads 44 and 46.

The circuit diagram of FIG. 5 illustrates two important and unique uses of the transducers described above. The single circuit is adapted for use as a stable oscillator and as a frequency sensitive or frequency responsive unit. The mode of operation is determined by the position of the switch 48. As shown in FIG. 5 a double pole double throw switch including switch section 48 is in the upper position whereby the circuit is connected as an oscillator. When switch 48 is thrown to the lower position the circuit is adapted for use as a frequency sensitive device, filter, or decoder. The movable arm of switch 48 is connected to one terminal of the winding 36 of the electromagnet and the other terminal of winding 36 is connected to a common or ground bus 50. The winding 36 is energized from one winding 52 of a transformer 54 through conductor 56, the other terminal of transformer winding 52 being connected to the ground bus 50. The other winding 58 of transformer 54, which in this mode of operation may be considered as the primary winding, has one terminal connected to one electrode of the transducer 10. The other electrode of the transducer 10 is connected to the ground 50.

A potentiometer 60 is connected across a potential source such as battery 62 and one common connection of the battery and potentiometer is connected to ground 50. The wiper of potentiometer 60 is connected through a resistor 64 to the transformer winding 58. A capacitor 66 is connected across the corresponding terminals of the windings 52 and 58 for damping and filtering. With the foregoing arrangement of components, closure of switch 48 produces a small current in electromagnet winding 36 which attracts the electrodes within the transducer 10. Movement of the electrodes within the transducer results in a change in the current through the transducer, and consequently a change in the current in transformer winding 58. This change results in additional current in the transformer winding 52 which in turn further energizes the electromagnet winding 36. Thus, in accordance with the well known principles of oscillating circuits the electrodes move in one direction to the limits of the available travel, and thereafter the current through the electrodes tends to stabilize and consequently the current in the transformer winding 52 diminishes, resulting in reduced flux in the electromagnet winding 36 and return of the electrodes to the relaxed position. This phenomenon repeats with a periodicity principally dependent upon the resonant characteristics of the electrodes.

The foregoing oscillator circuit has been found to be extremely stable and reliable in use. It produces good waveform for all normal operation and is stable for changes in temperature, operating voltages, and other circuit characteristics over wide ranges of values.

When the switch 48 of FIG. 5 is thrown to the lower position a signal containing random or coded frequencies may be applied at the input terminals 74 and 76. Terminal 76 is connected to ground 50 and terminal 74 is connected through switch 48 to the electromagnet winding 36. Winding 36 will thus be energized with any signal applied thereto, but because of the mechanically resonant character of the electrode, the electrode will remain substantially non-responsive to all but the frequency to which they are tuned. At the resonant frequency of the reed or electrode the motion will be substantial, producing very substantial variations in the current flowing in the circuit which includes the electrodes, the transformer winding 58, resistor 64 and the combination of potentiometer 60 and battery 62.

An output terminal 68 is connected to transformer winding 52 by the second pole 70 associated with switch 48 and thus winding 52, in this configuration becomes an output or secondary winding. The output at terminal 68 varies with frequency in accordance with curve 78 of FIG. 4 and thus this is a chart of quality or circuit Q. As is apparent from the curve, the circuit has a relatively high equivalent Q, and is thus highly frequency selective. In the embodiment described where the resonant frequency is about 266 c.p.s., indicated by solid line 72, the half power points, indicated by broken lines 80 and 82 occur at about 264 c.p.s. and 268 c.p.s. respectively. It is believed that even greater selectivity can be attained through careful selection of components and precision in the manner of manufacture of the electrode and associated parts.

Transducers have been constructed in accordance with this invention having resonant frequencies in the range of 200 to 3000 cycles. However, this does not establish a limitation upon the frequency range as both higher and lower frequencies can be provided, if desired. By carefully selecting the components of the transducer and exercising normal care in manufacture, it is possible to design the transducer with a predetermined resonance value. However, because of the tolerances of manufacture and the high Q characteristics of the transducer, it is highly desirable to tune each transducer as a final manufacturing step. The necessity of selecting matched pairs or groups is thus eliminated.

In accordance with this invention, each transducer may be tuned or its resonant and vibratory characteristics altered in a unique manner. It has been found that a current may be passed between the two electrodes or conductors of a sufficient magnitude that a metallic deposition occurs. The current is nevertheless below the value at which any permanent destructive effects are produced in the glass envelope, gas, or other components. In general, the current, preferably unilateral, which best accomplishes the metallic transfer is approximately ten times the normal operating current for the transducer. Thus, in one typical embodiment, the normal operating current is 300 microamperes while desirable metal transfer occurs at 2.5 to 3.5 milliamperes.

It has been observed that at relatively low metal transfer currents, the action appears to concentrate near the free end of the electrodes and for increasing current the transfer involves a greater portion of the body of the electrodes. It has also been observed that the cathode exhibits a loss of mass while the anode exhibits a slightly reduced increase in mass. The difference in the two mass changes is the result of some metallic deposit upon the inner glass wall and other bodies within the envelope. It appears that the metal transfer is principally the result of the bombardment of the cathode with positive ions which in turn dislodge small metallic particles from the cathode which are deposited on the anode and inner envelope walls.

Figure 6:
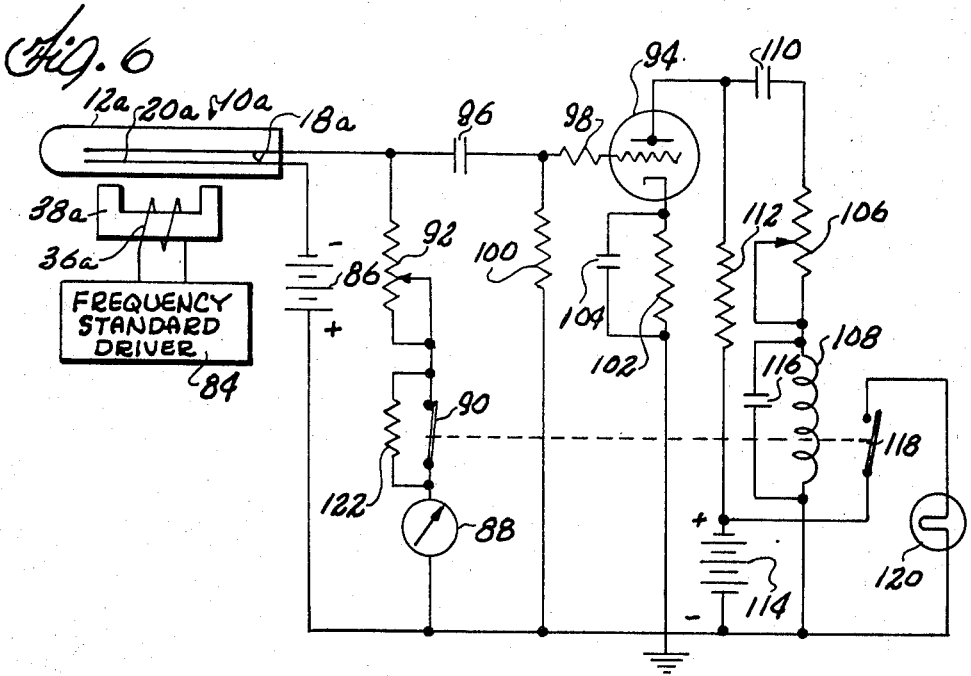
FIG. 6 is a circuit diagram illustrating one automatic technique and circuit for practicing the method of this invention.

In one typical embodiment of the invention employing iron-nickel-molybdenum electrodes, it has been found that a metal transfer current of 3.5 ma. produces a frequency change at the cathode of 10 cycles per second per hour of transfer. An automatic circuit for accomplishing the adjustment of frequency by altering the mass characteristics of the cathode is illustrated in FIG. 6. Therein, a transducer 10a is being tuned to a predetermined frequency by driving one of its electrodes 20a from a frequency standard 84. The output of frequency standard 84 is applied to the electromagnet including pole piece 38a and coil 36a. In practice, the coil and pole piece are preferably secured to the glass envelope 12a to form an integral unit. Also in mounting the transducer both for calibration and use, it is preferable to shock mount the glass envelope and motive device together to mechanically isolate them from their environment. It has been found in practice that mounting the complete unit only on its terminal wires which are selected to have the desired resiliency, excellent shock mounting and mechanical isolation result.

The frequency standard may be any well known device provided it has a stable output of a fixed frequency and preferably with a sinusoidal wave form. Various audio frequency generators are available with the required calibration and stability.

The electrodes 18a and 20a are energized from a D.C. supply 86, illustrated as a battery merely for convenience. The negative supply terminal is connected to the electrode 20a which is closest to the driver, and closest to the glass envelope 12a. The positive terminal of supply 86 is connected through a current meter 88, a normally closed switch 90 in parallel with resistor 122, and a current controlling variable resistor 92 to the more centrally located electrode 18a. The resistor 92 is adjusted to provide the required current through the transducer for metal transfer and consequent mass alteration. As mentioned herein, in one embodiment of the invention a current of 3.5 ma. was employed for this purpose.

As the frequency standard 84 is driving the electrode 18a, the current through the transducer 10a will have an A.C. component in accordance with the teaching of this invention. That A.C. component is coupled to the grid of an amplifier triode 94 through a capacitor 96 and a resistor 98. The grid of amplifier 94 is returned to ground through grid resistor 100. Cathode bias for amplifier 94 is provided by the cathode network including resistor 102 and capacitor 104.

The output of amplifier 94 is taken at the plate and applied through capacitor 110 calibrating resistor 106 and relay coil 108 to ground. The D.C. return for amplifier 94 is through resistor 112 and power supply 114 to ground. As already discussed above, the power supply 114 is shown as comprising a battery; however any well regulated power supply will prove satisfactory.

Relay coil 108 is provided with a buffer capacitor 116 and is mechanically arranged to open normally-closed contact 90 and to close normally-open contact 118. Opening contact 90 places resistor 122 in series with variable resistor 92 and thus reduces the current through transducer 10a. Resistor 122 is selected to produce a current through transducer 10a which is less than that required for metal transfer and the device will operate in its normal mode. In the typical embodiment described above, this would be approximately 350 microamperes. The energization of coil 108 will also close contact 118 which is in series with an indicating lamp 120 which is energized by the supply 114.

In the described system, the transducer 10a will initially have a resonant frequency below the predetermined frequency as established by driver 84. As the electrode 20a is the cathode, its mass will be reduced and its resonant frequency raised as already discussed. The output voltage appearing across resistor 100 will follow the curve of FIG. 4. As the mass is altered and the resonant frequency of electrode 20a approaches the driver frequency, the A.C. voltage will rise rapidly to a level where relay coil 108 actuates switches 90 and 118. At this point mass alteration is terminated.

Because the transducer was substantially overdriven by supply 86, the reduction in unilateral current will not produce a proportional decrease in A.C. signal. Furthermore, the hysteresis provided by relay coil 108 should be sufficient to maintain actuation following removal of the substantial D.C. component. If the circuit exhibits any hunting or oscillatory effects they may be eliminated readily by utilizing holding contacts with respect to coil 108.

As will be apparent, the transducers 10 may thus be automatically tuned to form high Q devices having a very narrow frequency response to a frequency automatically adjusted to within a few cycles of the desideratum.

While several specific embodiments of the invention have been described in some detail, other systems using the unique transducer and modifications of the transducer will immediately occur to one skilled in the art. It appears that the unusual characteristics observed in this invention are a result of variable current flowing between the electrodes as a result of the proximity of an electrode to a wall such as the wall of envelope 12. As the electrodes move toward the glass wall portion 22 the current will change or vary. While a non-conductive wall is preferred, it appears that the effect is also present when the wall is conductive. It is probable that this phenomenon is the result of the progressive variation and reconstruction of the plasma, space charge or ion field which surrounds the electrodes during conduction.

The effect may be produced by placing the moving electrode or electrodes close to the envelope as described above or an equivalent wall may be created through the use of auxiliary devices. Included among the auxiliary devices contemplated are mechanical devices such as a non-conductive wall or barrier mounted within the envelope and electrical devices such as a rigidly mounted biased electrode to create an effective electrical wall.

It has been found that the gas within the envelope should be continuously ionized for best results and thus it is necessary to provide a sufficient voltage between the electrodes to insure ionization, but a limited current to prevent arc discharge in normal operation. In the described embodiment a voltage of 400 volts in source 62 with a one megohm potentiometer 60 connected thereacross was found satisfactory. It appears that with these parameters and the gas and circuit parameters given above the space charge around the electrodes is effectively altered by motion toward the envelope wall in such a manner that the current is reduced in a generally linear manner. The output is substantially sinusoidal irrespective of the nature of the periodic input.

The variations are very substantial and enable the construction of simple circuits with low or negligible power requirements such as those described above. Nevertheless the circuits are capable of very substantial outputs. The current variations are produced by physical movement of the electrodes that is so slight that it is sometimes imperceptible to the unaided eye. Thus the device is capable of substantially higher operating frequencies than have heretofore been associated with the more inexpensive mechanical resonators.

Without further elaboration, the foregoing will so fully explain the characteristics of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. An electromechanical transducer comprising a rigid envelope, an ionizable gas contained within said envelope, a conductive electrode within said envelope and movable with respect thereto, a conductor within said envelope spaced from said conductive electrode, and means moving said envelope as a unit whereby the inertia of said conductive electrode produces relative movement between said envelope and said electrode to produce a significant change in the spacing therebetween.

2. An electromechanical transducer comprising a rigid envelope, an ionizable gas contained within said envelope, a conductive electrode within said envelope and movable with respect thereto, a conductor within said envelope spaced from said conductive electrode, means producing an electric current between said electrode and said conductor, the magnitude of said current being dependent upon the spacing between said electrode and said envelope and means moving said envelope as a unit whereby the inertia of said conductive electrode produces relative movement between said envelope and said electrode.

3. An electromechanical transducer comprising a rigid envelope, an ionizable gas contained within said envelope, a conductive electrode within said envelope and movable with respect thereto, a conductor within said envelope spaced from said conductive electrode, means producing an electric current between said electrode and said conductor, the magnitude of said current being dependent upon the spacing between said electrode and said envelope, said means for producing an electric current providing continuous current irrespective of the relative positions of said electrode and said envelope and means moving said envelope as a unit whereby the inertia of said conductive electrode produces relative movement between said envelope and said electrode.

4. The transducer of claim 1 wherein the means for moving the envelope comprises means in engagement with said envelope and adapted to periodically move said envelope with an amplitude and periodicity such that the inertia of said electrode produces relative motion between said electrode and said envelope.

5. The transducer of claim 1 wherein the means for moving the envelope is a multiple layer transducer secured to said envelope and having a transducing characteristic wherein the shape of said transducer changes with the application of voltage thereto.

6. An electromechanical transducer comprising a rigid envelope, an ionizable gas contained within said envelope spaced from said conductive electrode, and elongate conductive electrode mounted as a cantilever within said envelope, and movable therein, a conductor within said envelope spaced from said conductive electrode, circuit means to maintain a continuous current between said electrode and said conductor, and means moving said envelope as a unit whereby the inertia of said conductive electrode produces relative movement between said electrode and said envelope.

7. The electromechanical transducer of claim 6 wherein said electrode is selected to have a predetermined resonant frequency.

8. The electromechanical transducer of claim 6 wherein said electrode is selected to have a predetermined resonant frequency and said means moving said envelope produces periodic motion of said electrode.

9. An electromechanical transducer comprising a rigid envelope, an ionizable gas contained within said envelope, an elongate conductive electrode having a resonant frequency and mounted as a cantilever within said envelope and movable therein, a conductor within said envelope spaced from said conductive electrode, circuit means to maintain a continuous current between said electrode and said conductor, motive means adapted to periodically move said envelope as a unit, whereby said electrode moves and the current between said electrode and said conductor varies, and means sensing the periodic component of said current whereby a maximum current is sensed whenever the periodicity of said motive means is harmonically related to said resonant frequency.

10. The electromechanical transducer of claim 9 wherein said motive means comprises a vibratory member attached to said envelope to move said envelope in a direction transverse to said electrode and thus produce periodic motion of said electrode relative to said envelope.

11. The electromechanical transducer of claim 10 wherein said motive means is a multiple layer electrostrictive device secured to said envelope.

12. The electromechanical transducer of claim 9 wherein said electrode is formed of a metallic material having a constant Young's modulus over a substantial temperature range.

13. An electromechanical transducer comprising an envelope, a conductive electrode within said envelope and movable with respect thereto, a conductor within said envelope spaced from said conductive electrode, a predetermined atmosphere within said envelope, and means moving said envelope in space as a unit to produce relative movement between said envelope and said electrode by virtue of the inertia thereof.

14. An electromechanical transducer comprising an envelope, an elongate conductive electrode mounted as a cantilever within said envelope and movable therein, a conductor within said envelope spaced from said conductive electrode means producing an electric current between said electrode and said conductor, a predetermined atmosphere within said envelope, and means moving said envelope to produce relative movement between said envelope and said electrode by virtue of the inertia of said electrode.

References Cited

UNITED STATES PATENTS

| | | | |
|---|---|---|---|
| 2,185,966 | 1/1940 | Pfanstiehl | 310—8.2 X |
| 2,258,437 | 10/1941 | Badgley | 313—152 |
| 2,666,200 | 1/1954 | Krieger | 313—148 |

JAMES W. LAWRENCE, Primary Examiner.

P. C. DEMEO, Assistant Examiner.

U.S. Cl. X.R.

73—70.2; 310—8.2; 313—146; 331—126